(12) United States Patent
Lagoni et al.

(10) Patent No.: US 11,727,459 B2
(45) Date of Patent: *Aug. 15, 2023

(54) SEARCH QUERY-BASED REPLACEMENT PART INTERFACE

(71) Applicant: Amazon Technologies, Inc., Seattle, WA (US)

(72) Inventors: Meghan Lagoni, Seattle, WA (US); Chad Pham Driesbach, Seattle, WA (US); Andrew Robert Toner, Bothell, WA (US); Sachin Midha, New Delhi (IN); Jai P. Chabria, Seattle, WA (US); Nirav Praful Desai, Sammamish, WA (US); Brad P. Bonnett, Seoul (KR); Nicholas Stephen Bogert, Seattle, WA (US); Thiyagarajan Ramasamy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

This patent is subject to a terminal disclaimer.

(21) Appl. No.: 16/932,551

(22) Filed: Jul. 17, 2020

(65) Prior Publication Data
US 2020/0349626 A1 Nov. 5, 2020

Related U.S. Application Data

(62) Division of application No. 14/637,328, filed on Mar. 3, 2015, now Pat. No. 10,748,200.

(51) Int. Cl.
G06Q 30/0601 (2023.01)
G06F 16/951 (2019.01)
G06F 16/33 (2019.01)

(52) U.S. Cl.
CPC ..... *G06Q 30/0625* (2013.01); *G06F 16/3349* (2019.01); *G06F 16/951* (2019.01); *G06Q 30/0603* (2013.01); *G06Q 30/0641* (2013.01)

(58) Field of Classification Search
None
See application file for complete search history.

(56) References Cited

U.S. PATENT DOCUMENTS 7,574,426 B1 * 8/2009 Ortega ............... G06F 16/3329
2002/0038238 A1 3/2002 Fujita
(Continued)

FOREIGN PATENT DOCUMENTS

EP 1176530 1/2002

OTHER PUBLICATIONS

F. Silvestri, R. Baraglia, C. Lucchese, S. Orlando and R. Perego, "(Query) History Teaches Everything, Including the Future," 2008 Latin American Web Conference, Vitoria, Brazil, 2008, pp. 12-22, doi: 10.1109/LA-WEB.2008.21 (Year: 2008).*
(Continued)

*Primary Examiner* — Michelle T Kringen
(74) *Attorney, Agent, or Firm* — Knobbe Martens Olson & Bear LLP

(57) ABSTRACT

The systems and methods disclosed herein can increase the speed and ease with which a user can discover compatible replacement parts for a specified model of a product by automatically determining when the user is interested in replacement parts. A replacement part system can conclude that a user is looking for replacement parts based on the user's search queries, the user's browsing behavior, or the user's prior purchases. By automatically deducing an intention to purchase a replacement part, the replacement part system can make it easier for a user to locate suitable replacement parts. In addition, the replacement part system
(Continued)

can be configured to tailor listing set of replacement parts search results it provides to a user. The set of search results can be tailored based on a number of criteria to increase the speed with which the user finds a compatible replacement part.

17 Claims, 11 Drawing Sheets

(56) References Cited

U.S. PATENT DOCUMENTS

| | | |
|---|---|---|
| 2010/0031366 A1 | 2/2010 | Knight et al. |
| 2012/0259884 A1* | 10/2012 | Donehue ................. B60C 23/02 707/769 |
| 2013/0159143 A1 | 6/2013 | Cheney |
| 2014/0279248 A1* | 9/2014 | Westphal ........... G06Q 30/0641 705/26.62 |
| 2015/0006325 A1 | 1/2015 | Zhao |
| 2015/0032548 A1* | 1/2015 | Shapiro .............. G06Q 30/0269 705/14.66 |
| 2015/0052022 A1 | 2/2015 | Christy et al. |
| 2015/0356520 A1* | 12/2015 | Mitti .................... G06Q 10/087 705/305 |

OTHER PUBLICATIONS

Sears Parts Direct Website, http://www.searspartsdirect.com, webpage dated Mar. 2, 2016 in 1 page.

The Home Depot Parts Locator Website, http://www.domedepto.eom/c/SF_MS_SV_Parts_Locator, dated Mar. 2, 2016 in 3 pages.

PCT Search Report and Written Opinion for Application No. PCT/US2016/020714 dated Jun. 23, 2016 in 15 pages.

Lee, Jong-Seok, and Sigurdur Olafsson. "Two-way cooperative prediction for collaborative filtering recommendations." Expert Systems with Applications 36.3 (2009): 5353-5361 (Year: 2009).

* cited by examiner

SEARCH QUERY-BASED REPLACEMENT PART INTERFACE

CROSS-REFERENCE TO RELATED APPLICATIONS

This application is a divisional of U.S. patent application Ser. No. 14/637,328, entitled "SEARCH QUERY-BASED REPLACEMENT PART INTERFACE" and filed on Mar. 3, 2015, the entire disclosure of which is hereby incorporated by reference herein.

BACKGROUND

Generally described, computing devices and communication networks can be utilized to exchange information. In a common application, a computing device can request content from another computing device via a communication network. For example, a user at a personal computing device can utilize a browser software application, referred to as a "web browser" or simply as a "browser," to request a network page from a server computing device via the Internet. In such implementations, the user's personal computing device can be referred to as a "client" and the server computing device can be referred to as a "server."

In many cases, the server may be operated by a retailer, wholesaler, or other entity that provides information regarding items (e.g., products and/or services) to potential customers and other interested parties. The server may provide item information along with recommendations for related items. For example, the server can provide a network page that includes information for a given item in conjunction with related items that are often bought along with, or instead of, the given item. In some instances, the given item is a replacement part for a product and the related items may be replacement parts for similar products. The customer may be interested in identifying potential replacement parts and their equivalents for a particular product, such as a product that the customer owns or is interested in purchasing.

From the perspective of a customer utilizing a user computing device to request and view item information from an item information provider, a user experience can be defined in terms of the ease with which the customer can locate suitable or desired replacement parts for particular products. Difficulty in finding compatible replacement parts, or confusing, ambiguous, or misleading information about replacement parts, may diminish the user experience.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
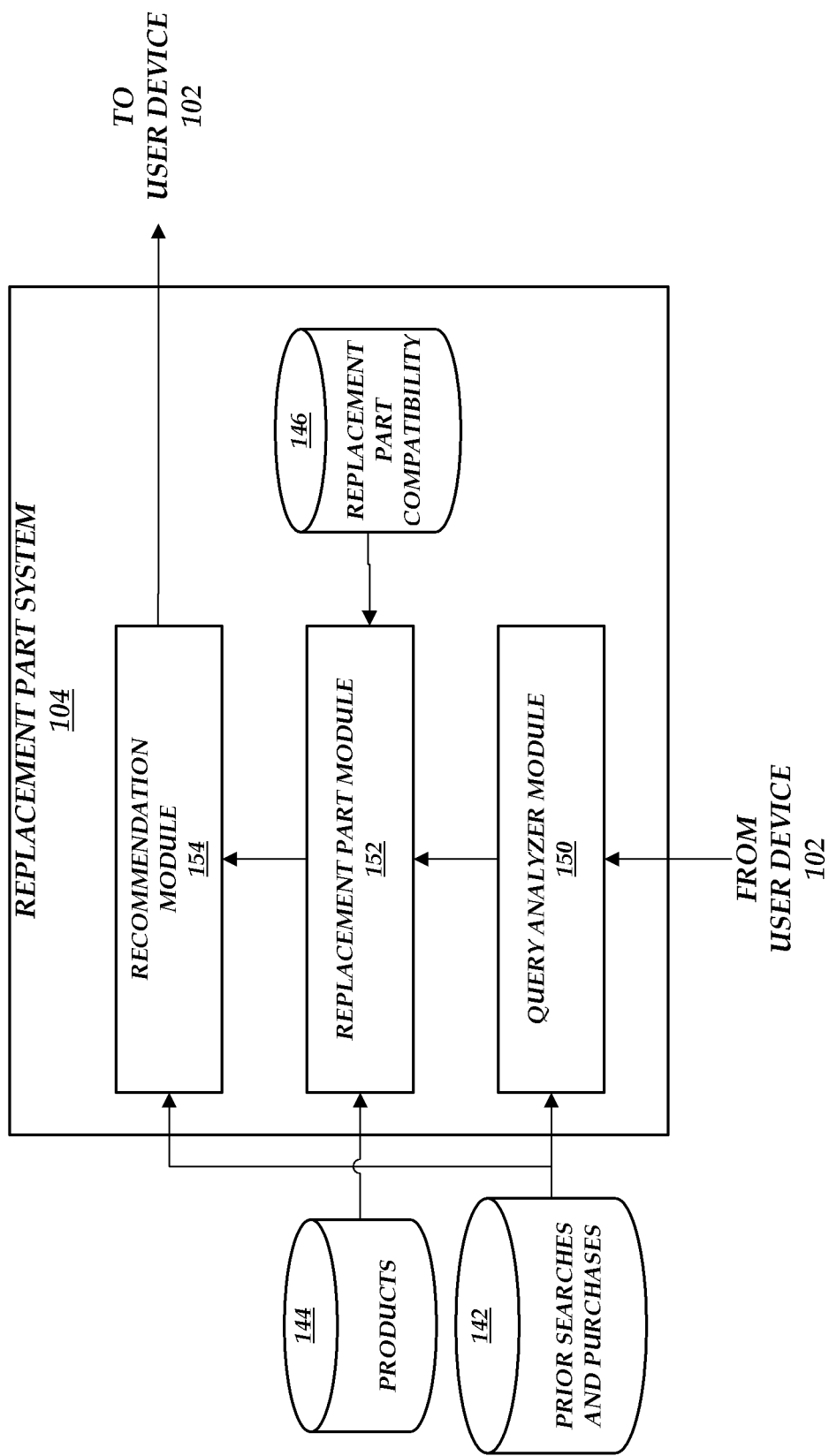
FIG. 1A illustrates various blocks in a replacement part system that can be used to provide model-based tailoring of replacement parts.

The present disclosure is directed to increasing the speed and ease with which a user can discover compatible replacement parts for a specified model of a product by automatically determining when the user is interested in replacement parts. The systems and methods described herein also provide for a server system configured to identify intent to purchase a replacement part and to provide replacement parts when that intent is identified. A replacement part system, such as a replacement part system implemented on a server of an electronic commerce system, can conclude that a user is looking for replacement parts based on, for example and without limitation, the user's search queries, the user's browsing behavior, and/or the user's prior purchases. The replacement part system may also receive other input from the user that indicates intent to purchase a replacement part. By automatically deducing an intention to purchase a replacement part, the replacement part system can return results that include replacement parts to the user. This can lead to greater efficiency for the server because the replacement part system can limit when it queries a replacement part data store to when it has deduced intent to purchase replacement parts. This can also make it easier for a user to locate suitable replacement parts because the user will be presented replacement parts when it is likely the user intends to purchase such parts.

In addition, the replacement part system can be configured to tailor a set of replacement parts search results it provides to a user. The set of search results or listing can be tailored based on popularity of replacement parts, the user's prior purchases, other users' interactions, a category of the product or replacement part, external factors (e.g., time of year, location of the user, etc.), or any combination of these or similar factors. By tailoring the set of replacement parts search results, the replacement part system can increase the probability that the results returned to the user will include parts of interest to the user, and can increase the speed with which the user finds a compatible replacement part.

The present disclosure also discloses a replacement part system that identifies generic parts that are compatible replacements for original equipment manufacturer ("OEM") parts. The replacement part system can be configured to provide links to generic replacement parts and the OEM replacement parts with which they are compatible. The replacement part system can thus provide search results that include OEM parts along with compatible generic parts, increasing the options for the user. The replacement part system can also make it easier for vendors of generic replacement parts to link their products to compatible models, increasing exposure of their products to users and potentially increasing sales. It is to be understood that compatibility (e.g., compatible replacement parts) indicates, but is not limited to, that an item or product can be successfully used to provide the same or similar functionality as the item(s) or product(s) it replaces. For example, a compatible water filter for a particular model of refrigerator is a water filter or other such assembly that can be used to provide the same or similar functionality as the water filter originally installed in the refrigerator by the manufacturer. Compatibility can also indicate that an accessory can be successfully used with a product even if the product did not include the accessory when manufactured. For example, an expandable shelf can be compatible with a refrigerator even if the refrigerator did not originally include an expandable shelf. Compatibility can also indicate that a part is interchangeable with another part. For example, an OEM part is compatible with a generic part where the generic part is structurally or otherwise equivalent to the OEM part so that they are capable of being interchangeably used in a product.

Conventional systems that provide information about replacement parts typically provide that information using a replacement part system that is separate from a larger electronic commerce system. To search and browse replacement parts, the user must first leave the larger electronic commerce system and enter a different experience dedicated to replacement parts. For example, the user may be browsing a first networked site (e.g., a Website) for replacement parts. This first networked site may then redirect the user to a second networked site dedicated to replacement parts, requiring the user to leave the first networked site. This can be detrimental to sellers providing products on the first networked site because potential buyers have been directed away from the site. This can also be detrimental to the user experience due at least in part to a fractured shopping experience. These conventional dedicated replacement part systems may also reduce the number of products provided or displayed to the user, reducing the likelihood that the user finds a suitable replacement part.

Conventional systems that provide information about replacement parts typically provide that information without sorting or curating the list of parts. The list of replacement parts may be presented in an arbitrary order, without considerations for popularity, user preference, external factors, or the like. With an unsorted list of replacement parts, it may be difficult for the user to identify an appropriate or desirable replacement part because a popular replacement part may appear near the end of replacement part options. This may confuse or mislead the user into thinking that the part is unpopular, faulty, or potentially incompatible. Similarly, conventional systems may curate lists of replacement parts manually. For example, people who work on behalf of a networked commerce site may select and/or promote certain replacement parts. This can mislead a user into thinking that promoted replacement parts are preferable to other replacement parts. However, the promoted replacement parts may not be promoted due to quality or popularity, but based on other criteria that are not tied to these attributes. Furthermore, it may be laborious and/or time consuming to update large lists of replacement parts so that changes in quality and/or popularity of replacement parts may be not be reflected in the curated lists.

Conventional systems that provide replacement parts through interaction with a server typically provide replacement part information at the level of the manufacturer (e.g., Black & Decker®) rather than at the level of the product model (e.g., Black & Decker BDDP100 Drill Press). When using these conventional systems, a user may be presented with a number of replacement parts that are not compatible with the user's product model. The listed replacement parts may be compatible with other products from the same manufacturer and not compatible with the particular model of interest to the user. This makes it more difficult for the user to identify compatible replacement parts. This also increases the likelihood that the user will purchase an incompatible replacement part.

Accordingly, presented herein are systems and methods for providing information about replacement parts to a user. A replacement part system can be an integrated part of the larger electronic commerce system. For example, the replacement part system can be configured to infer an intention to buy replacement parts and to provide replacement part options as part of the user's experience on the larger electronic commerce system. The replacement part system can curate sets of replacement parts search results based on automated criteria. For example, the automated criteria can be configured to promote to the user replacement parts that are compatible with a model of a product that the user owns or in which the user has shown interest. The replacement part system can limit replacement parts search results to parts that are designated as being compatible with a specified product model. Thus, the replacement part system can aid a user in identifying compatible replacement parts while increasing the ease, accuracy, and efficiency of the user's shopping experience.

Some aspects of the present disclosure relate to a replacement part system configured to determine a likelihood that a user is interested in shopping for replacement parts. If the likelihood lies within a tailored range of values and/or exceeds a threshold, the replacement part system can introduce replacement parts into a set of search results that include products provided in response to a user search. The likelihood can be determined based on prior queries and purchases by the user, searches and purchases by other users, or other criteria. In this way, the user can utilize the replacement part system to find compatible replacement parts as part of the user's shopping experience. For example, if the user searches for "Whirlpool refrigerator parts," the replacement part system may conclude that the user is interested in replacement parts for a Whirlpool refrigerator. The replacement part system can include in the search results replacement parts compatible with Whirlpool refrigerators. The replacement part system may also request additional information, such as a specific model of refrigerator. The specific model information can be obtained through other methods including, for example and without limitation, using a bar code, identifying a model from a picture, using a product ID tag or label, analyzing a purchase history of a user, or any combination of these or the like. With this information, the replacement part system can narrow or tailor the set of replacement parts search results to include parts compatible with the specified model. If the determined likelihood does not exceed the threshold or lies within a tailored range of values, the replacement part system can introduce a user interface element within a network site to request additional information from a user. For example, the user interface element may prompt the user to indicate whether the user is interested in replacement parts for a specific product.

Additional aspects of the present disclosure relate to a replacement part system to personalize or tailor listings of replacement parts. The replacement part system can analyze information related to the user (e.g., past purchases, search queries, location, etc.) to provide results tailored to the needs of the user. For example, the replacement part system can determine that the user owns or indicated an interest in a particular model of a washing machine. Based on that information, the replacement part system can analyze the user's search query and provide replacement part results that are compatible and/or related with the particular model of the washing machine. The replacement part system can also analyze information related to other users. For example, the replacement part system can analyze a popularity of replacement parts compatible with the particular model of the washing machine. The replacement part system can then tailor the results of the user's query based on popularity of replacement parts. The popularity can be determined from shopping behaviors across all users on the electronic commerce system or it can be limited to a subset of users, such as users that own the particular model of the washing machine. The replacement part system can also analyze information related to external factors, such as time of year, location of the user, and the like. For example, the replacement part system can tailor replacement part listings to include parts for a lawn mower in spring or summer and a snow blower in fall or winter.

Further aspects of the present disclosure relate to a replacement part system that tailors results of a query to include parts that are compatible with a specified model and to exclude parts that are incompatible with that model. The replacement part system can include a replacement part compatibility data store that includes information about product models and compatible parts, wherein the compatible parts can be provided by multiple sellers, vendors, manufacturers, etc. Using this data store, the replacement part system can identify compatible parts provided by any number of vendors. For example, the replacement part system can list parts that are compatible with a particular model of oven, including OEM parts and generic parts.

Still further aspects of the present disclosure relate to the automated analysis of vendor items to determine product models with which the items are compatible. For example, a vendor can enter information about an item, including a compatible OEM part (e.g., a part number of the OEM part for which the vendor's item acts as an equivalent). The replacement party system can analyze OEM part and model information stored in a replacement part compatibility data store to generate a list of product models that are compatible with the vendor's item. Thus, when the replacement part system provides sets of replacement parts search results the vendor's item can be included if it is has been determined to be compatible.

The replacement part system, implemented on an electronic commerce system for example, may provide several benefits. For example, a user can search and shop for replacement parts alongside other items in a single, unified, or integrated user experience. As another example, listings of replacement parts can include replacement parts that are guaranteed or that have a high likelihood of compatibility with a specified product model. As yet another example, the tailored or personalized replacement parts listings can result in high quality parts being found and purchased, enhancing the user's overall experience. As another example, the replacement part system can provide an enhanced experience for vendors, facilitating the identification of compatible product models for vendors' parts. For example, the replacement part system can receive a product identification number from a vendor, such as an OEM part number, and automatically link the vendor's part or product to the OEM part associated with the received number. This link can be used by the replacement part system to identify OEM parts and their compatible generic parts. This can also increase the exposure to users of generic parts, which may be beneficial for users and vendors alike. As another example, the replacement part system can include a variety of user interface elements on a network site. This can enhance the user experience by increasing the speed and ease with which a user can find and purchase compatible replacement parts.

Although aspects of the embodiments described in this disclosure will focus, for the purpose of illustration, on an electronic commerce system that provides information about compatible replacement parts to users, one skilled in the art will appreciate that the techniques disclosed herein may be applied to a number of services, processes, or applications. For example, systems and methods of determining compatible replacement parts may be used for other purposes, such as identifying potential upgrades to products (e.g., automobiles, computers, cameras, etc.), or the like. In addition, although aspects of the present disclosure use servers, browsers, and networked sites to generate and display tailored sets or lists of replacement parts search results, other client applications and devices may be used. For example, dedicated shopping applications on a user device may be used to provide networked access to the replacement part system to identify personalized replacement parts. Various aspects of the disclosure will now be described with regard to certain examples and embodiments, which are intended to illustrate but not limit the disclosure.

System Components

FIG. 1A illustrates various blocks in a replacement part system 104 that can be used to provide a user with a tailored or personalized listing of compatible replacement parts. The replacement part system 104 can be configured to determine intent to shop for replacement parts, identify compatible replacement parts, tailor listings of replacement parts, display personalized replacement parts, and/or provide user interface elements for managing the user's experience with the replacement part system 104. For example, the replacement part system 104 can be configured to receive information regarding a product model and to find replacement parts manufactured specifically to be compatible with that model. The replacement part system 104 can be accessed through a variety of methods, such as through user interface elements presented on networked sites such as, for example and without limitation, product information sites, product category sites, search results sites, product recommendation sites, and the like.

To control access to the functionality of the replacement part system 104, a query analyzer module 150 is configured to analyze search queries and/or other user interactions. Based on the search queries and/or other user interactions, the query analyzer module 150 can access other data and functionality within the replacement part system 104. For example, the query analyzer module 150 can be configured to determine a likelihood that a user is searching or shopping for replacement parts. Based on this likelihood, the replacement part system 104 can be configured to provide a tailored list of replacement parts and/or to prompt or request additional input related to replacement parts.

The query analyzer module 150 can be configured to determine a specific model of a product associated with the search for compatible replacement parts. This can be accomplished using a designated user interface element, stored information about the user, by analyzing a search query received from the user device 102, analyzing images, analyzing product identification tags, or the like. For example, a user interface element can be displayed on a networked site requesting or verifying a specific model number in conjunction with the search for replacement parts. In some embodiments, the query analyzer module 150 can receive this information from the user device 102 in an interaction separate from the search query. Examples of such user interface elements are described herein with reference to FIGS. 5 and 7.

The query analyzer module 150 can be configured to receive a search query from the user device 102. The query analyzer module 150 can compare the search query to prior searches stored in the prior searches and purchases data store 142. The query analyzer module 150 can determine the likelihood that the search query indicates an intention to purchase a replacement part. This determination can be based on a statistical analysis that compares the received search query to prior search queries and any purchases related to those search queries. This information can be determined using information stored in the prior searches and purchases data store 142. If, for example, the search query matches or is similar to search queries that resulted in users viewing or purchasing a replacement part 90% of the time, then the query analyzer module 150 can conclude that the likelihood that the current user is interested in shopping for replacement parts is 90%. As another example, the search query can be compared to similar search queries to determine the frequency with which users viewed and/or purchased a particular item. The likelihood can be based on a comparison of the search query, the related search queries, and the frequencies of item views and/or purchases. The query analyzer module 150 can be configured to perform this analysis for additional queries, or re-queries, that add, delete, or otherwise revise the search query to refine the results. For example, an initial query may lead to a first likelihood value determination, but subsequent queries may change that determination based on an evaluation of the string or series of search queries.

In some embodiments, the prior searches and purchases data store 142 stores information about search queries, items viewed in connection with each search query or collection of search queries, and/or items ultimately purchased in connection with each search query or collection of search queries. A collection of queries can include a plurality of search queries performed during a single session and that are related. For example, a collection of queries can include two or more queries that include or that are related to a common keyword, product, item, category, or the like. A user can provide an initial query and then refine the query based on the results of the initial query. These connected queries can be collected and treated as a single query or as a collection of queries.

The prior searches and purchases data store 142 may be located external to the replacement part system 104, such as on a separate system or server. The query analyzer module 150 can be configured to analyze information stored in the prior searches and purchases data store 142. For example, the query analyzer module 150 may receive a search query and parse the text to compare it to prior searches or collections of searches stored in the prior searches and purchases data store 142. The query analyzer module 150 may use text processing techniques, such as natural language processing or other simple text parsing mechanisms, to analyze the text and identify relevant keywords for comparison with prior search queries stored in the prior searches and purchases data store 142.

The likelihood value determined by the query analyzer module 150 can be used to regulate access to other modules, data, and functionality within the replacement part system 104. This can make the shopping experience for a user appear to be seamless whether the user is searching for replacement parts or other products. For example, if the likelihood value is less than a threshold value or is not within a tailored range of values, the replacement part system 104 may not be used to provide results in response to the search query. In this example, the results include items provided by the electronic commerce system and do not include items identified by the replacement part system 104. On the other hand, if the likelihood value is greater than or equal to the threshold value and/or within the tailored range of values, the replacement part system 104 may be used to provide a personalized listing of replacement parts in response to the search query. In some embodiments, the replacement part system 104 is configured to provide staged entry into a replacement part platform. For example, the likelihood value determined by the query analyzer module 150 can be used to determine a response to the user's query. If the likelihood is within a first range of values, the replacement part system 104 can be configured to request additional information to better determine whether a user is interested in replacement parts. For example, input can be requested regarding the user's intent. As another example, a verification of intent can be requested. If the likelihood is within a second range of values, the second range higher than the first range, the replacement part system 104 can be configured to return replacement parts in response to the search query without additional requests for information and/or without additional input from a user. In these scenarios, the replacement part system 104 can be configured to respond to a query with products in which the user is likely interested. From the user's point of view, a listing of items is returned in response to the search query. The listing of items may or may not include replacement parts depending the likelihood of interest in replacement parts determined by the query analyzer module 150. However, even if the response to the search query includes replacement parts provided by the replacement part system 104, the user remains within the same network infrastructure provided by the electronic commerce system (e.g., the user is not redirected to a separate family of networked sites). In this case, the user still has access to the functionality and data provided by the electronic commerce system but has also gained access to the functionality and data provided by the replacement part system 104. The threshold likelihood value for regulating access to the replacement part system 104 can be, for example and without limitation, 99%, 97%, 95%, 90%, 85%, 80%, 75%, 70%, 60%, 50%, at least 40% and/or less than or equal to 99%, at least 50% and/or less than or equal to 95%, at least 70% and/or less than or equal to 90%, or at least 85% and/or less than or equal to 95%. The tailored range of values for regulating access to the replacement part system 104 can be, for example and without limitation, 99% to 100%, 97% to 100%, 95% to 100%, 90% to 100%, 85% to 100%, 80% to 100%, 75% to 100%, 70% to 100%, 60% to 100%, 50% to 100%, at least 40% and/or less than or equal to 99%, at least 50% and/or less than or equal to 95%, at least 70% and/or less than or equal to 90%, or at least 85% and/or less than or equal to 95%. The first range of values for regulating access to the replacement part system 104 can be, for example and without limitation, 50% to 70%, 30% to 80%, 30% to 90%, 50% to 90%, 70% to 95%, 70% to 90%, 75% to 95%, 60% to 80%, 50% to 80%, and/or 50% to 95%.

If the query analyzer module 150 determines that the likelihood is greater than the threshold value and/or within the tailored range of values, then the query analyzer module 150 will communicate this result to a replacement part module 152. The replacement part module 152 can be configured to analyze the search query and/or other information provided by the query analyzer module 150 to identify a list of replacement parts compatible with the specified model. The replacement part module 152 can identify replacement parts that are compatible with the specified model by searching item information in a replacement part compatibility data store 146. The replacement part compatibility data store 146 includes information about items and the models with which they are compatible. The items may be OEM parts or generic parts. The items may be compatible with one or more product models.

The replacement part module 152 can identify products available from the electronic commerce system by comparing the identified list of replacement parts to available products in the products data store 144. The products data store 144 includes information about products available within the electronic commerce system. The information can include a description of the item, pictures of the item, a product category, a product name, and the like. This information can be used to filter the list of replacement parts to include parts that are available through the electronic commerce system and/or exclude parts that are not available. This information can be used to provide an indication of which replacement parts in the list are available through the electronic commerce system. The products data store 144 may be located external to the replacement part system 104 and/or the prior searches and purchases data store 142, such as on a separate system or server.

The list of replacement parts identified by the replacement part module 152 can be communicated to the recommendation module 154. The recommendation module 154 can be configured to generate a tailored and/or personalized list of replacement parts that are compatible with the specified model. The recommendation module 154 can compare the received list of replacement parts to information in the prior searches and purchases data store 142. Using this information, the recommendation module 154 can sort and/or filter the list of replacement parts. A rule-based framework may be used to sort and filter the items. For example and without limitation, a decision tree or algorithm may define a ranking or weight for a particular item depending on popularity, user rating, sales ranking, cost, and/or category of the item. A user's prior purchases, prior interactions of other owners of a specified model, and/or external factors may also be used to determine the ranking or weight of an item. The recommendation module 154 can then send the ordered list to the user device 102. The ordered list can include all the replacement parts identified by the replacement part module 152 or it can include a subset of those items. For example, the replacement part module 152 can exclude items from the ordered list if the ranking or weighting of the item does not meet designated criteria. In this way, the recommendation module 154 can be configured to provide to the user a tailored list of replacement parts that are compatible with the specified model.

The replacement part system 104 can be configured to store information about specific models for one or more users. For example, the replacement part system 104 can store one or more specific models for a particular user in the replacement part compatibility data store 146. When that user performs a search, if the replacement part system 104 determines an intention to purchase a replacement part, the replacement part system 104 can use the user's specific models stored in the replacement part compatibility data store 146 to provide a personalized listing of replacement parts.

The replacement part system 104 can be used by vendors to generate model compatibility information. The model compatibility information can then be stored in the replacement part compatibility data store 146. For example, a vendor can submit information about a replacement part to be sold on the electronic commerce system. The information can include an OEM part number to indicate that the vendor's replacement part is interchangeable with the OEM part or a replacement for the OEM part. This information can be received by the query analyzer module 150, for example, and sent to the replacement part module 152. The replacement part module 152 can analyze information in the replacement part compatibility data store 146 to locate the OEM part identified by the OEM part number provided by the vendor. Using this information, the replacement part module 152 can identify one or more models that use the OEM part. The replacement part module 152 can then update the replacement part compatibility data store 146 to list the vendor's part as being compatible with the identified one or more models that use the designated OEM part. In this way, the vendor does not have to identify each and every model with which the vendor's part is compatible. If the vendor provides the relevant OEM part number, the vendor's replacement part can be automatically linked to the compatible models. This can increase exposure of the vendor's replacement part to users while also easing the burden on the vendor to identify compatible models. This can also enable the replacement part system 104 to include OEM parts along with generic parts in the tailored list of replacement parts provided to the user. The replacement part system 104 can use the OEM part number provided by the vendor to ensure that the generic part provided by the vendor is compatible with the one or more models. This can increase the number of replacement part options provided to the user, enhancing the user's experience in shopping for replacement parts.

System Components in an Example Environment

Figure 1B:
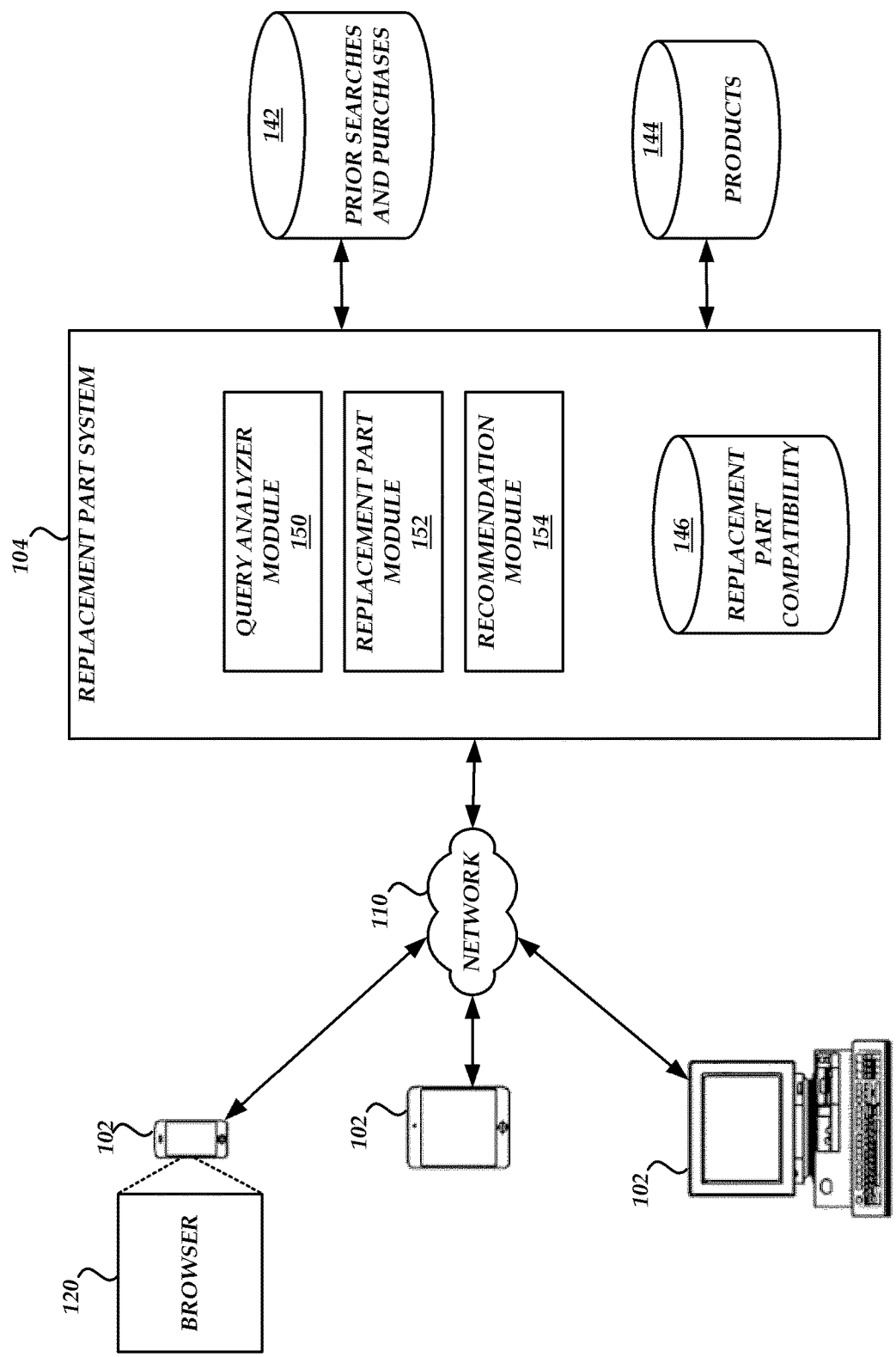
FIG. 1B illustrates a network environment in which the replacement part system of FIG. 1A may provide replacement part listings.

FIG. 1B illustrates an exemplary replacement part environment with the replacement part system 104 of FIG. 1A according to some embodiments. The environment shown in FIG. 1B may be one of many possible environments in which the replacement part system 104 can be implemented. As illustrated in FIG. 1B, the environment includes various user devices 102 and the replacement part system 104. The replacement part system 104 may include multiple distinct computers or machines, some of which may be assigned to different tasks than others. The system components may communicate with each other via one or more communication networks 110. The network 110 may be a publicly accessible network of linked networks, possibly operated by various distinct parties, such as the Internet. In certain embodiments, the network 110 may include a private network, personal area network, local area network, wide area network, cable network, satellite network, cellular telephone network, etc. or combination thereof, each with access to and/or from the Internet.

The user devices 102 can access the replacement part system 104 through the network 110. In some embodiments, a browser 120 can be used to view information from the replacement part system 104 and/or interact with the replacement part system 104. For example, a user device 102 can use a browser 120 to search an electronic catalog for items, where at least some of the items are provided by the replacement part system 104, as described herein. A user of the user device 102 can use elements rendered in the browser 120 to refine the site-wide search results by replacement part. For example, the browser 120 can provide a way for the user to indicate that a particular water filter is of interest. The replacement part system 104 can then refine the list of items returned as part of an initial search query. The refined list can include items that are interchangeable with, compatible with, or that are otherwise related to the particular water filter of interest. In certain embodiments, OEM parts and generic parts that replace the listed OEM parts can be displayed in the browser 120 as a result of interactions with the replacement part system 104.

As described herein, user interactions with the replacement part system 104 can be limited until an intention to purchase a replacement part is discerned by the query analyzer module 150. For example, a user can use the browser 120 to send an initial search query over the network 110 to the replacement part system 104 as well as to an electronic commerce system (e.g., where the replacement part system 104 is a part of the electronic commerce system). If the initial search query does not indicate an interest in replacement parts, as determined by the query analyzer module 150, the replacement part system 104 does not send replacement part results to the browser 120 on the user device 102. Instead, the search results returned to the user device 102 may be based on a search of an electronic catalog managed by the electronic commerce system. On the other hand, if the initial search query (or subsequent re-queries) indicates an interest in replacement parts, the search results sent by the electronic commerce system to the user device 102 can be supplemented with results sent from the replacement part system 104. The replacement part results sent by the replacement part system 104 can be determined using data stored in the replacement part compatibility data store 146. In some embodiments, the information from the replacement part compatibility data store 146 can be supplemented with information stored in the products data store 144. In certain implementations, the products data store 144 includes the electronic catalog of the electronic commerce system.

The environment may include any number of distinct user devices 102. In addition, multiple (e.g., two or more) replacement part systems 104 may be used. For example, separate replacement part systems 104 may be located so that they are close (in either a geographical or networking sense) to groups of current or potential user devices 102. In such a configuration, a user device 102 may receive a tailored listing of replacement parts via the replacement part system 104 to which it is closest, rather than all user devices 102 receiving tailored listings of replacement parts via a single replacement part system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the replacement part system 104, in order to search for replacement parts. The user devices 102 may execute the browser application 120 that can be used by a user to access a page that provides replacement parts listings.

The replacement part system 104 can be a computing system configured to determine intent to purchase replacement parts, compile lists of compatible replacement parts, generate personalized listings of replacement parts, and/or link generic parts from vendors to compatible models using OEM part numbers. For example, the replacement part system 104 can be a physical server or group of physical servers that may be accessed via the network 110.

The replacement part system 104 can be a computing system configured to provide network resources to user devices 102. For example, the replacement part system 104 can be a physical server computing device or group of physical server computing devices that may be accessed via the network 110. As described above with respect to FIG. 1A, the replacement part system 104 may include one or more processors that implement specific computer-executable instructions (referred to herein as modules or components), as well as data stores, and the like to provide the replacement part functionality described herein. For example, the replacement part system 104 may include the query analyzer module 150, the replacement part module 152, the recommendation module 154, and the replacement part compatibility data store 146. In some embodiments, the replacement part system 104 may include additional or fewer modules than those shown in FIG. 1B. The replacement part system 104 may be part of a larger electronic catalog system or electronic commerce system that provides functionality for users to, e.g., interactively browse, search for, review, rate, tag, purchase, sell and obtain recommendations of catalog items such as appliances, electronics, vehicle components, etc. Examples of such systems are described in greater detail, e.g., in U.S. Pat. Nos. 7,685,074, 7,472,077 and 8,122,020, each of which is incorporated herein by reference in its entirety.

The query analyzer module 150, the replacement part module 152, and/or the recommendation module 154 can operate in parallel and for multiple users at the same time. For example, listings of replacement parts for unique user devices 102 may be requested and the components of the replacement part system 104 can automatically generate the listings simultaneously or nearly simultaneously for the unique user devices 102 in real-time.

As described above, in some embodiments, the prior searches and purchases data store 142 is located external to the replacement part system 104. For example, the prior searches and purchases data store 142 may be stored and managed by a separate system or server (e.g., a server that manages user searches and purchases) and may be in communication with the replacement part system 104 via a direct connection or an indirect connection (e.g., via a network, such as the network 110). In other embodiments, not shown, the prior searches and purchases data store 142 is located within the replacement part system 104.

The products data store 144 may also be located external to the replacement part system 104. For example, the products data store 144 may be stored and managed by a separate system or server (e.g., a server that manages user searches and purchases) and may be in communication with the replacement part system 104 via a direct connection or an indirect connection (e.g., via a network, such as the network 110). In other embodiments, not shown, the products data store 144 is located within the replacement part system 104.

The replacement part system 104 may be a single physical computing device, or it may include multiple distinct physical computing devices, such as computer servers, logically or physically grouped together to collectively operate as a replacement part system 104. The modules and components of the replacement part system 104 can each be implemented as hardware or as software implemented by hardware. In addition, the modules and components of the replacement part system 104 can be combined on one server computing device or separated individually or into groups on several server computing devices. In some embodiments, the replacement part system 104 may include additional or fewer components than illustrated in FIG. 1B.

In some embodiments, the features and services provided by the replacement part system 104 may be implemented as web services consumable via the communication network 110. In further embodiments, the replacement part system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

With reference to an illustrative embodiment, a user may use a browser 120 operating on a user computing device 102 to access the replacement part system 104 in order to obtain information about replacement parts. The user may be presented with a home page, search screen, or some other interface to search for items or item information, and the user can submit search queries and view search results. This process may be managed by the query analyzer module 150, the recommendation module 154, or some other module or component of the replacement part system 104. The recommendation module 154 or some other module or component of the replacement part system 104 can respond to requests for information about replacement parts for particular models of products. For example, the recommendation module 154 can provide a network resource in response to a user query for replacement parts for a specific model of a product in search results generated by the recommendation module 154.

Example Process for Providing a List of Replacement Parts

Figure 2:
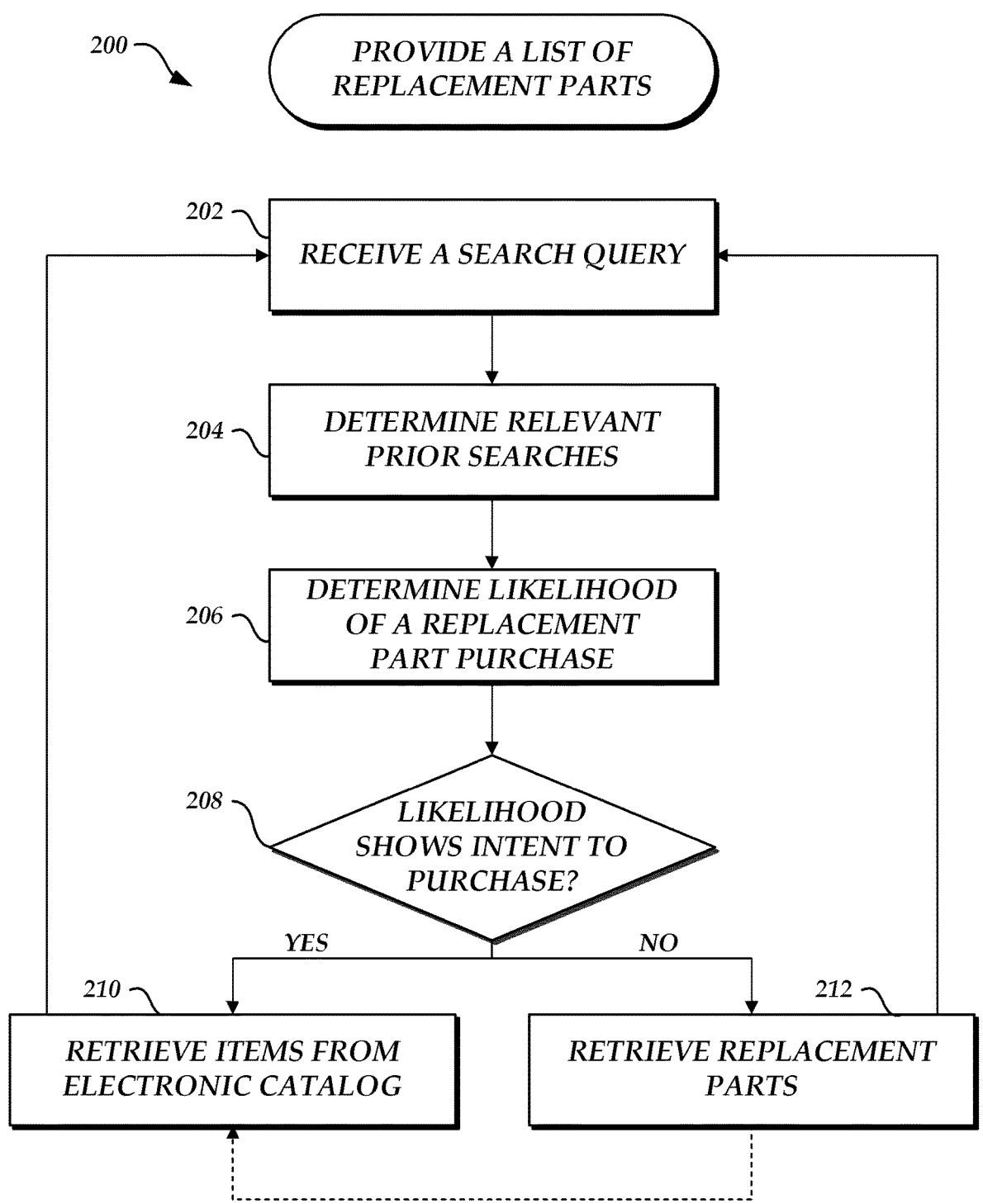
FIG. 2 illustrates a flow diagram of an example process for providing model-based replacement part information.

FIG. 2 illustrates a process 200 that may be used to automatically determine whether to provide a list of replacement parts to a user. As an example, the replacement part system 104 of FIG. 1A can be configured to implement the process 200. Similarly, the replacement part system 104 of FIG. 1A can be configure to implement the processes 300 and 400 described herein with reference to FIGS. 3 and 4, respectively. Each of the processes 200, 300, and/or 400 may be embodied in a set of executable program instructions stored on one or more non-transitory computer-readable media, such as one or more disk drives or solid-state memory devices, of one or more physical computing systems with which the replacement part system 104 is associated. When each process 200, 300, and/or 400 is initiated, the executable program instructions can be loaded into memory, such as RAM, and executed by one or more processors. In some embodiments, each process 200, 300, and/or 400 can be performed by multiple computing devices, such as servers, and the processes or portions thereof may be executed by multiple servers, serially or in parallel.

With reference to FIG. 2, at block 202, a search query is received from a user device associated with a user. The search query may include an explicit or implicit request for replacement parts (e.g., the user device may explicitly request to receive results from the replacement part system 104). For example, the user device may request a page that includes information about one or more replacement parts, such as a product page that lists OEM parts and generic parts, as described herein with reference to FIG. 8. The search query can be parsed to extract information for analysis. In some embodiments, the search query is parsed and aggregated with prior search queries provided by the user.

At block 204, the parsed query can be compared to prior searches from other users and/or the same user to determine relevant prior searches. A relevant prior search can include prior searches that are identical, equivalent, or similar to the receive query. A list of prior queries can thus be generated using the results of this comparison.

At block 206, a likelihood of intent to purchase a replacement part is determined. Using the list of prior queries, item views and item purchases resulting from the prior queries are analyzed. From the prior queries, a probability can be determined that the current search query will result in a purchase of a replacement part. For example, if 30% of the prior searches resulted in a purchase of a replacement part, then the current search query can be assigned a likelihood value of 30%, where the likelihood value reflects the likelihood that the user performing the received search query will purchase a replacement part.

At block 208, the likelihood is compared to a threshold likelihood value or a tailored range of values to determine intent to purchase or interest in replacement parts. This serves to control when the replacement part service is utilized to provide replacement parts listings to a user. For example, if there is a relatively low likelihood that the user is not searching for replacement parts, it may be more appropriate, and preferable for the user, to retrieve items from an electronic catalog in response to a search query rather than providing a listing of replacement parts. In some embodiments, as described herein, the threshold value can be about 90% so that replacement parts listings are provided to the user when it is relatively likely that the user is searching for replacement parts. In some embodiments, if the likelihood is within the tailored range of values, further information may be requested to determine intent to purchase replacement parts, as described herein. For example, if the likelihood is determined to be within a range of about 50% to 90%, the replacement part service can request verification of interest in replacement parts. When interest is verified, the replacement part system can be used to retrieve replacement part items.

At block 210, items are retrieved from an electronic catalog if the likelihood is less than the threshold value, if it is not within the tailored range of values, or if interest in replacement parts is not verified as tested at block 208. The electronic catalog is generally accessed to identify relevant items in response to a user query. At block 212, items are retrieved from a replacement parts data store if the likelihood is greater than or equal to the threshold value or if interest in replacement parts is verified as tested at block 208. In some embodiments, items may also be retrieved from the electronic catalog in addition to items from the replacement parts data store. This is represented by the dashed line connecting block 212 to block 210 in FIG. 2.

The results (e.g., items from the electronic catalog and/or items from the replacement parts data store) may be output for display to the user, or may be combined with the results of other recommendation processes (such as those described in the above-referenced patents) for purposes of selecting items to recommend. The replacement parts can be tailored and/or personalized according to methods described herein, such as the process 400 described herein with reference to FIG. 4. For example, the replacement parts can be selected based at least in part on one or more product models specified by a user or associated with a user in a data store, as described herein with reference to FIG. 3 (e.g., the replacement part compatibility data store described with reference to FIG. 1A).

The process 200 can return to block 202 to aggregate additional queries, as described elsewhere herein, or it can terminate. The additional queries can be used to refine the initial search query. The additional queries may also change the likelihood that the user is searching for replacement parts, so the process 200 can begin again to account for updates to the search query by the user. This process 200 can repeat any number of times to refine the search query to provide desirable results to the user. The search query can be refined by aggregating individual search queries into a collection of search queries. The collection of search queries can be compared to prior searches and/or prior collections of search queries to determine the likelihood discussed at block 206.

Example Process for Determining Compatible Replacement Parts

Figure 3:
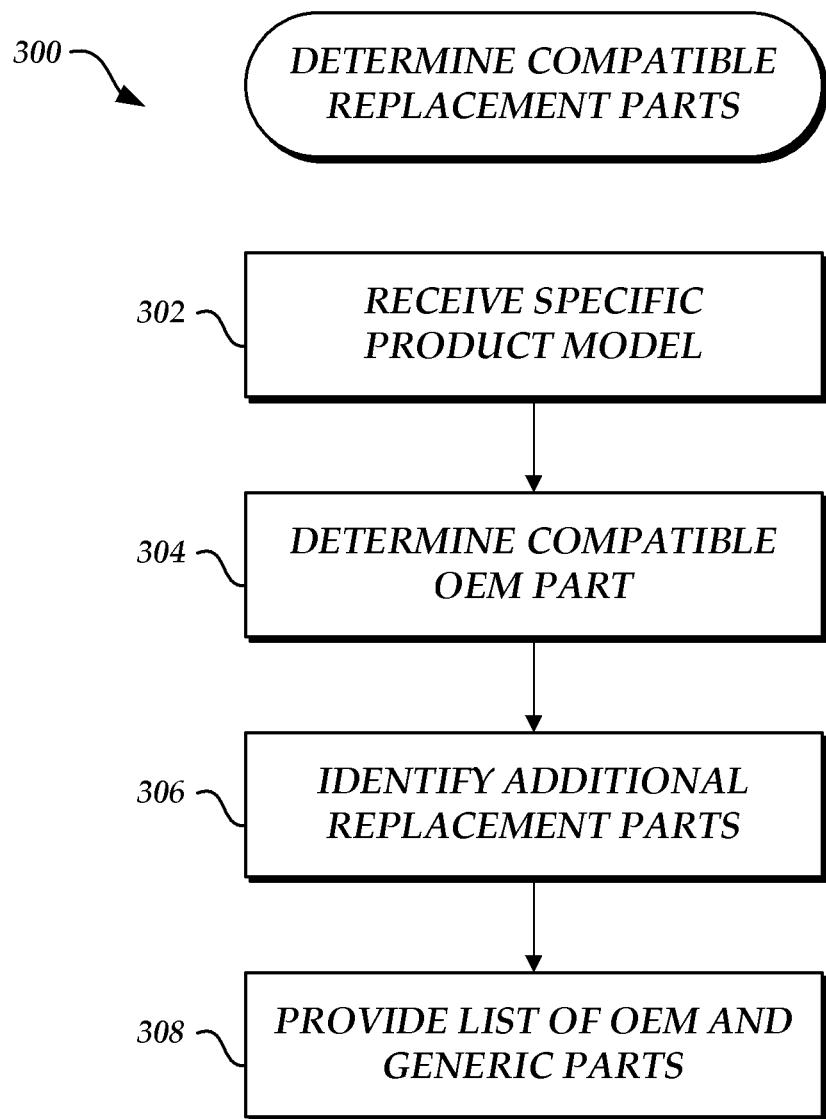
FIG. 3 illustrates a flow diagram of an example process for determining compatible replacement parts based on a designated model of a product.

FIG. 3 illustrates a flow diagram of an example process 300 for determining compatible replacement parts based on a designated model of a product. The process 300 can be used to ensure that listings of replacement parts provided to the user include compatible replacement parts and exclude incompatible parts.

At block 302, a model number of a product is designated. The model number can be any identification that serves to uniquely determine a particular model of a product, differentiating it from similar models, similar products, products from different manufacturers, and the like. The model number can be specific to the manufacturer. In some instances, different manufacturers can have products with the same model number. The replacement part system 104 can be configured to determine which model number and manufacturer is appropriate based on context. The context can include a search query, preferences of a user, purchase and/or browsing history of the user, popularity of the model, external factors, or the like. In some embodiments, the model number is provided by a user in response to a query from the replacement part system 104. For example, networked pages can be provided with elements configured to receive model number information. Examples of such networked pages are described herein with reference to FIGS. 5 and 7. In certain embodiments, the model number is retrieved from a data store. For example, the user can store one or more products as part of a product collection for the user. This collection can facilitate identification of replacement parts and accessories in future shopping sessions. In some embodiments, the model number is automatically populated from a different system or server. For example, a service can be running on a first server, wherein the service determines a model number for which the service requests replacement part information. The first server can then communicate the model number to the replacement part system running on a second server.

At block 304, compatible OEM parts are determined. As described herein, the replacement part compatibility data store can be configured to link specific models with compatible replacement parts. In some embodiments, the models are linked to one or more OEM replacement parts. The data stored in the replacement part compatibility data store can relate model numbers with OEM replacement part numbers to facilitate identification of compatible OEM parts.

At block 306, compatible generic replacement parts are determined. As described herein, the replacement part compatibility data store can be configured to include OEM part numbers with which a generic part may be compatible. Accordingly, once compatible OEM parts are determined, compatible generic parts may be determined by identifying generic parts that are interchangeable with the identified OEM parts. In some embodiments, the replacement part compatibility data store can be configured to directly link generic parts to the model numbers with which they are compatible. When generic parts are included in the data store, a process may be run that identifies, for each generic part, the compatible model numbers. This can be accomplished where the generic part includes information about the OEM part that it is interchangeable with, for example. In this way, the process 300 can be implemented so that generic replacement parts may be provided to a user without determining compatible OEM parts as part of the process 400.

At block 308, the compatible OEM parts and generic parts are provided to the user. The replacement parts can be organized to display an OEM part along with each generic part that is interchangeable with that OEM part. This can increase the number of items presented to the user as well as increase the variety of options for the user. This in turn can advantageously enhance the user experience when shopping for replacement parts.

Example Process for Tailoring Replacement Parts Listings

Figure 4:
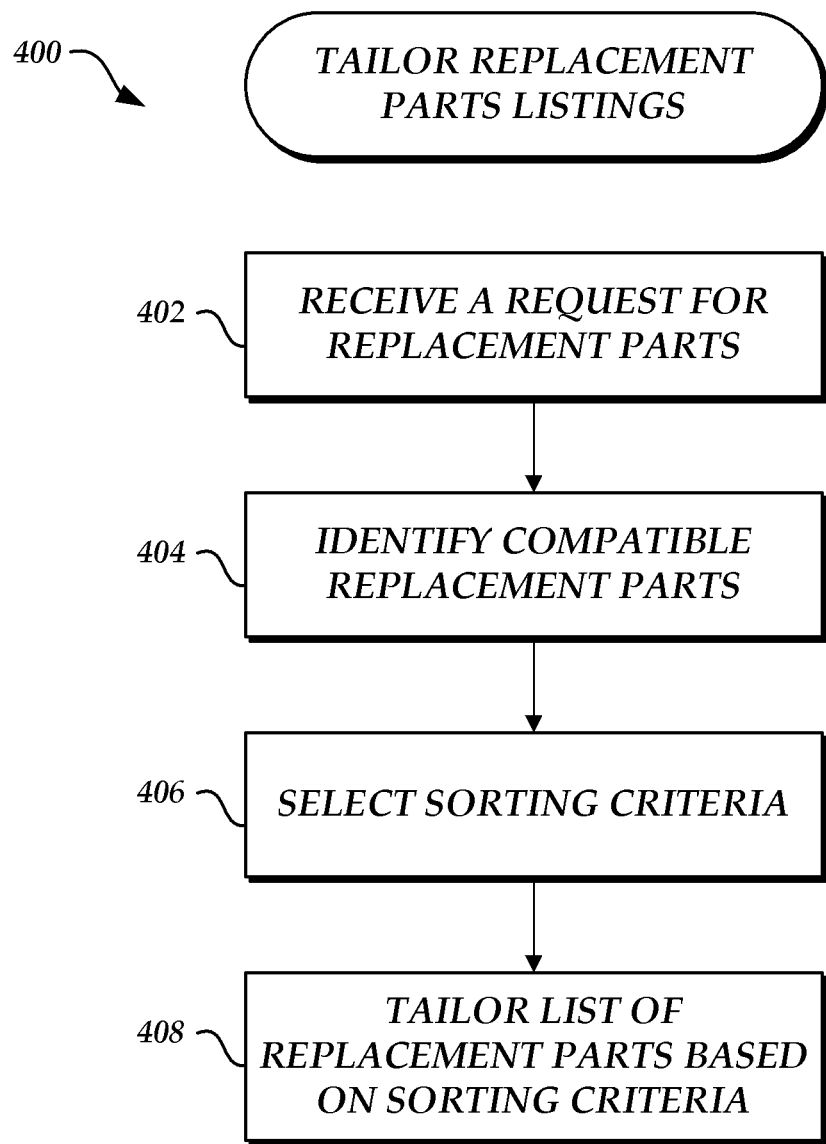
FIG. 4 illustrates a flow diagram of an example process for linking replacement parts provided by original equipment manufacturers with compatible generic replacement parts.

FIG. 4 illustrates a flow diagram of an example process for tailoring replacement parts listings. In the listing of replacement parts, both OEM and generic parts can be listed. Generic replacement parts can include any replacement parts that are not manufactured by the original equipment manufacturer. Linking OEM parts to generic parts increases the number of options for replacement parts for a user. By tailoring the replacement parts listing, the ease and speed with which a user can identify suitable replacement parts can be increased. This can enhance the user experience by providing a relatively easy and quick way to find suitable replacement parts for a product.

At block 402, a request for replacement parts is received. The request can come from another system or another module in the replacement part system 104. For example, the request can result from a search query that is determined to indicate an intention to purchase replacement parts, such as through the process 200 described herein with reference to FIG. 2. The request can be made explicitly or implicitly by the user, as described herein. In some embodiments, another system can request replacement parts when a product model is being displayed, as described herein with reference to FIGS. 8 and 9.

At block 404, the replacement part compatibility data store is searched to identify compatible replacement parts, including OEM parts and generic parts. This step can be similar to the process 300 described herein with reference to FIG. 3.

At block 406, sorting criteria is selected for tailoring the list of compatible replacement parts generated in block 404. The sorting criteria can include, for example and without limitation, sorting based on popularity of the product (e.g., number of sales within the replacement part system, number of sales within the electronic commerce system, number of views of a product information page, etc.), prior user purchases, prior behavior of other owners of a designated product model, external factors, or the like. The popularity of a replacement part can be based on an absolute number of sales or it can be based on a relative number of sales. The relative number of sales can compare sales of a first replacement part to a second replacement part if both replacement parts are compatible with the designated model. The popularity of a product can be calculated by limiting the information used to determine popularity to users that own the designated model. The sorting criteria can also be any weighted or non-weighted combination of any criteria identified herein.

At block 408, the list of replacement parts is sorted based on the criteria selected in block 406. The tailored listing of replacement parts can then be sent to a user or other system. This can increase the quality of options presented to a user when searching for replacement parts, thereby enhancing the user experience.

Example Network Pages Viewed on a User Device

FIGS. 5-10 illustrate representations of example network pages displayed on a user device, such as the user device 102. The network pages may be displayed within the user interface of the browser application 120 of the user device 102. The various network pages can be used to allow a user to enter model-specific information, to display replacement part information, to explore replacement parts based on compatibility with a product, and the like. Elements of the network pages described herein can be integrated with network pages provided by an electronic commerce system. These elements can be integrated with the electronic commerce system's network pages so that the normal experience of browsing items within the electronic commerce system is enhanced by providing the ability to take advantage of the replacement part system.

As described herein, the elements of the network pages described with reference to FIGS. 5-10 represent multiple points of potential ingress into the replacement part system. This can allow a smooth and relatively seamless transition to using the replacement part system. For example, while searching for refrigerators, an element can be included on a network page that asks whether the user is interested in filtering the results based on product compatibility. If the user indicates this desire, the replacement part system can filter the results of the search without taking the user away from the network pages provided by the electronic commerce system. Similarly, the replacement part system can be engaged when it is determined that the user intends to purchase a replacement part, as described herein with reference to FIGS. 1A and 2. For example, intent can be determined by comparing user search queries to prior search queries by other shoppers. Once the replacement part system is engaged, replacement part information can be provided on the network pages along with other search results or listed items. In some embodiments, a user can be directed to a product category page for replacement parts when intent to purchase replacement parts is determined.

Figure 5:
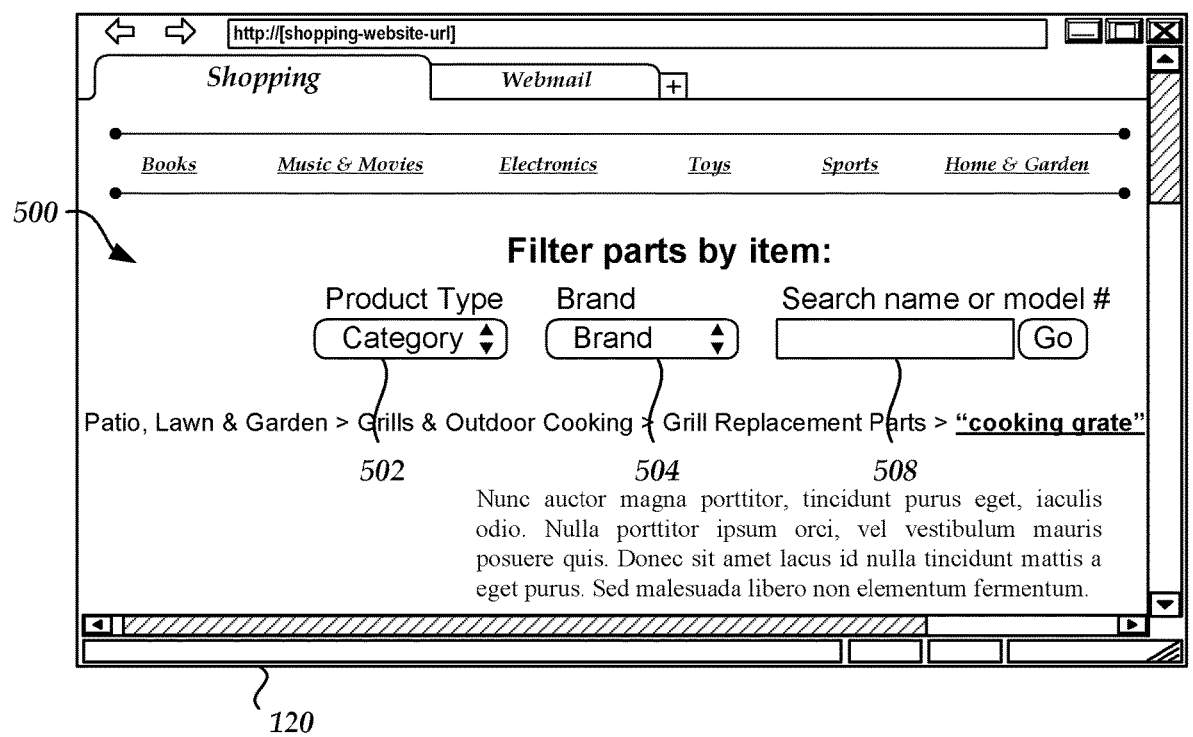
FIG. 5 illustrates a representation of an example network page displayed on a user device, the example network page configured to allow a user to specify a model of a product for determining available replacement parts manufactured specifically to that model.

FIG. 5 illustrates a representation of an example network page 500 that includes user interface elements 502, 504, 506 configured to allow a user to specify a model of a product. The specified model can then be used to determine available replacement parts manufactured specifically to fit the specified model. The network page 500 can be displayed within the browser application 120 of the user device 102.

The network page 500 includes product type element 502 configured to allow a user to enter a product category. Product categories can include, for example and without limitation, sports equipment, appliances, electronics, home and garden, and the like. The product type element 502 can be a drop-down selection element, a text entry box, or any other suitable element for receiving user input. Similarly, the network page 500 includes brand element 504 configured to allow a user to enter a product brand. The brand element 504 can be a drop-down selection element, a text entry box, or any other suitable element for receiving user input. The network page 500 includes a search box 506 configured to allow a user to enter a name or model number to be searched. In some embodiments, the elements 502, 504 can be used together and/or the search box 506 can be used alone or with the elements 502, 504. When the user provides information in one or more of the elements 502, 504, 506, the electronic commerce system and/or the replacement part system can retrieve and list models of products that are compatible with the provided information. In this way, the user can specify a particular model for future interactions with the replacement part system.

Figure 6A:
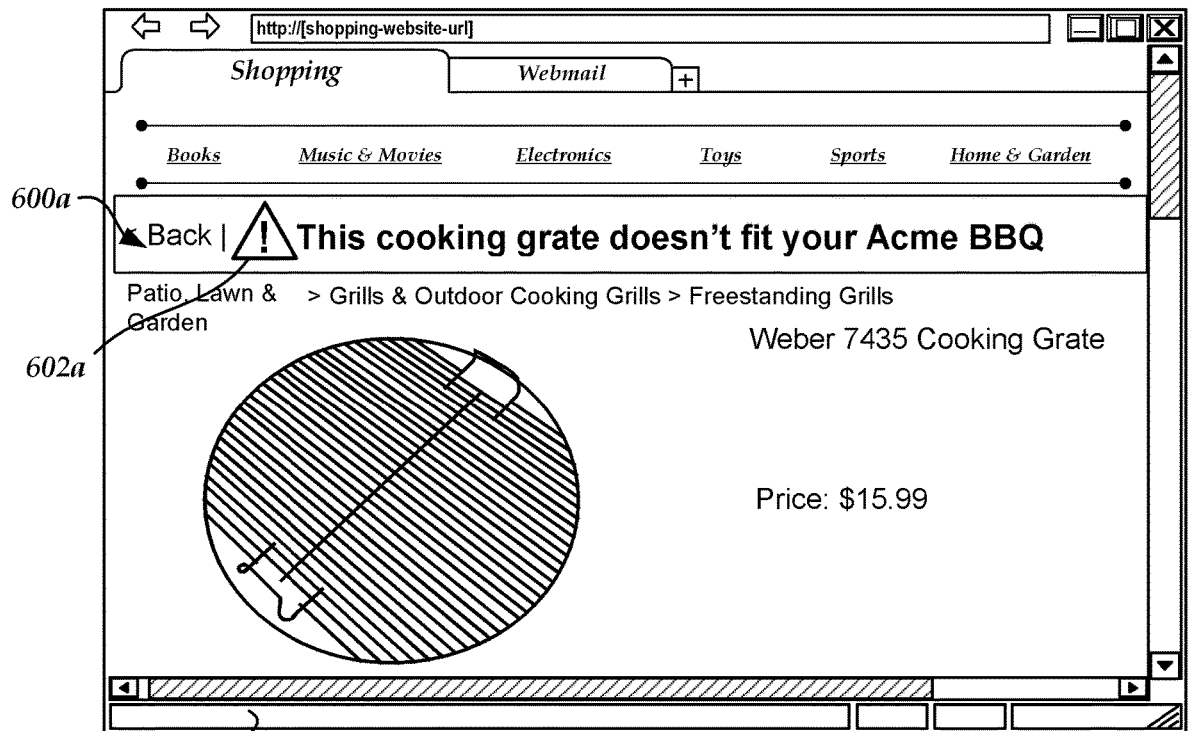
FIGS. 6A and 6B illustrate a representation of an example network page indicating compatibility of a part and a specified model of a product.
Figure 6B:
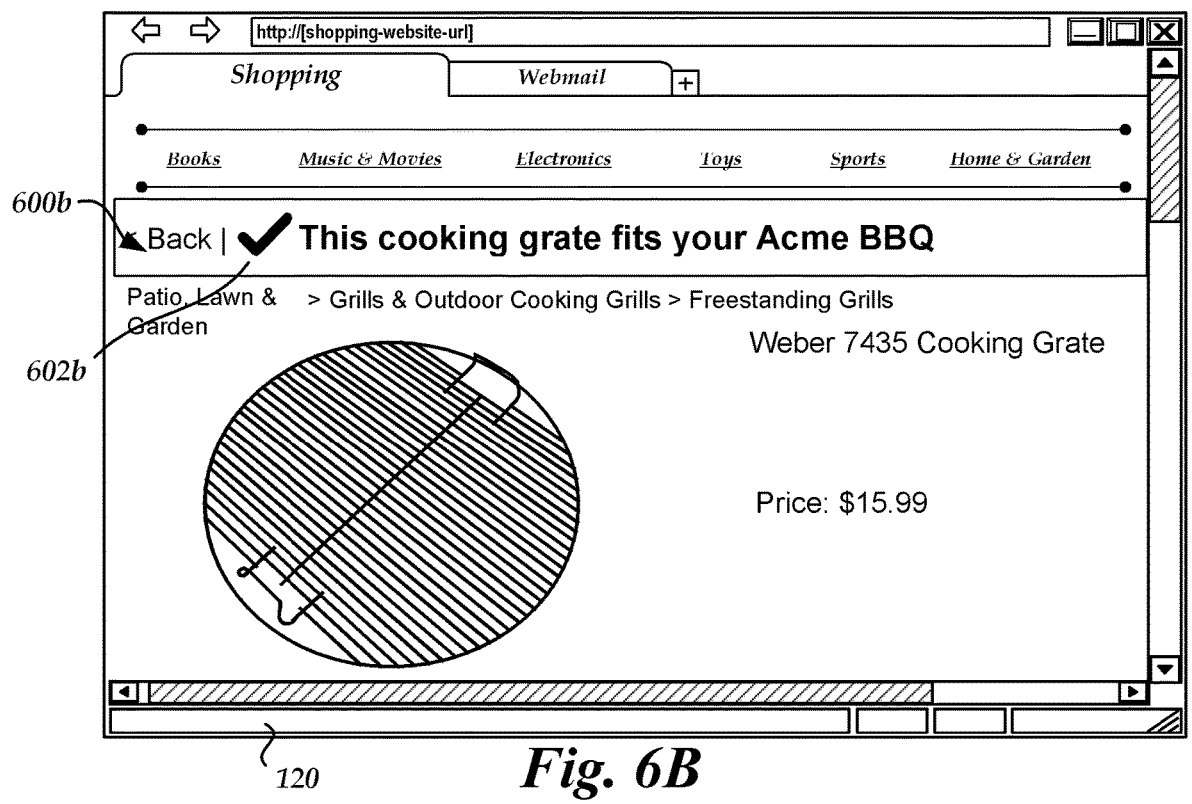

FIGS. 6A and 6B illustrate a representation of an example network page 600 indicating compatibility of a replacement part and a specified model of a product. In the example network pages 600a, 600b, a cooking grate for a grill is displayed along with a strip 602a, 602b indicating whether the cooking grate is compatible with a specified model. This can enable a user to determine with relative ease if a replacement part is compatible. In some embodiments, a user interface element can be provided when viewing an item on a network page (e.g., a fitment-specific replacement part detail page), wherein the user element allows a user to enter a model number to check whether the item being viewed is compatible with the specified model. The result of such an inquiry can be provided by the network pages 600a, 600b.

Figure 7:
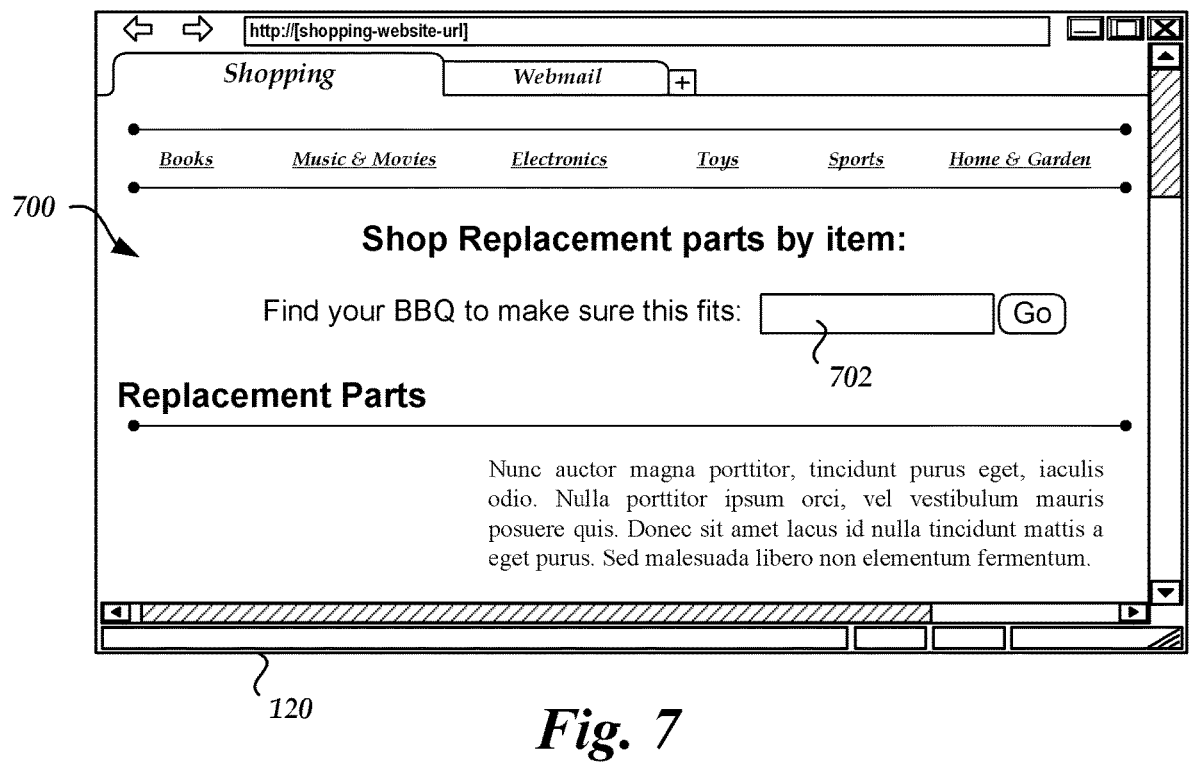
FIG. 7 illustrates a representation of an example network page configured to allow a user to shop for replacement parts for a specified model of a product.

FIG. 7 illustrates a representation of an example network page 700 configured to allow a user to shop for replacement parts for a specified model of a product. The network page 700 represents a replacement parts launching page, or a replacement parts store front page. The network page 700 provides the ability to shop replacement parts by item by providing a model number or other similar information in the text entry element 702.

Figure 8:
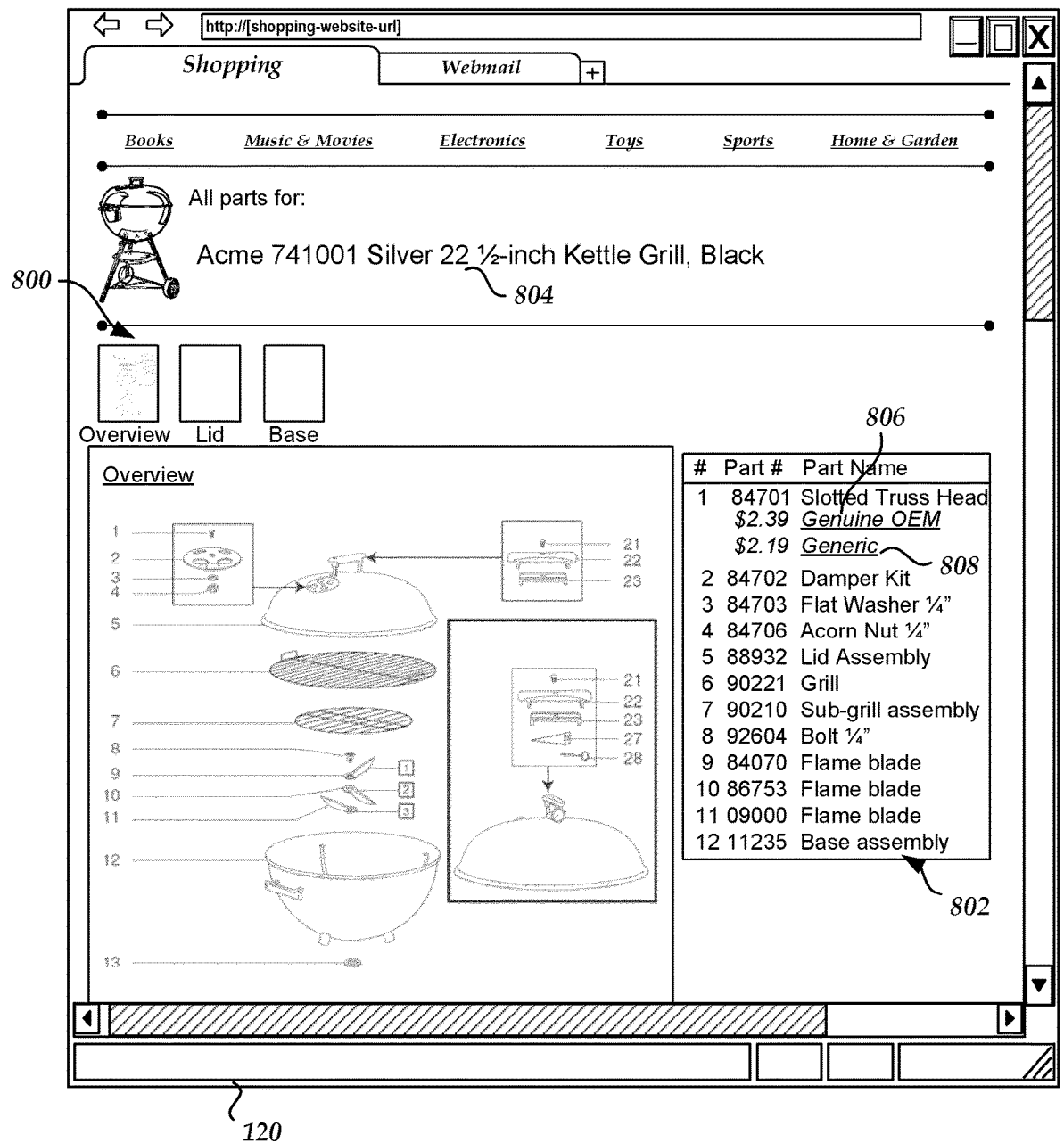
FIG. 8 illustrates a representation of an example network page displaying compatible replacement parts for a specified model of a product.

FIG. 8 illustrates a representation of an example network page 800 displaying compatible replacement parts 802 for a specified model of a product 804. When a user enters a specific model number in the network page 700, the results can be displayed as illustrated in network page 800. The network page 800 displays the specific model of the product 804 along with a list of replacement parts 802. In the list of replacement parts, compatible OEM and generic parts can be displayed, such as OEM part 806 and generic part 808. The OEM part 806 can be displayed grouped with the interchangeable generic part 808 to facilitate analysis of similar compatible parts.

In some embodiments, the network page 800 can be displayed after the user selects a particular model while browsing. In certain embodiments, the network page 800 can be displayed for a particular model that the user has saved in a data store. The network page 800 can represent a version of a detailed view of a product information page, wherein the information includes compatible replacement parts. In some embodiments, the replacement parts 802 are sorted based on sorting criteria, as described herein.

Figure 9:
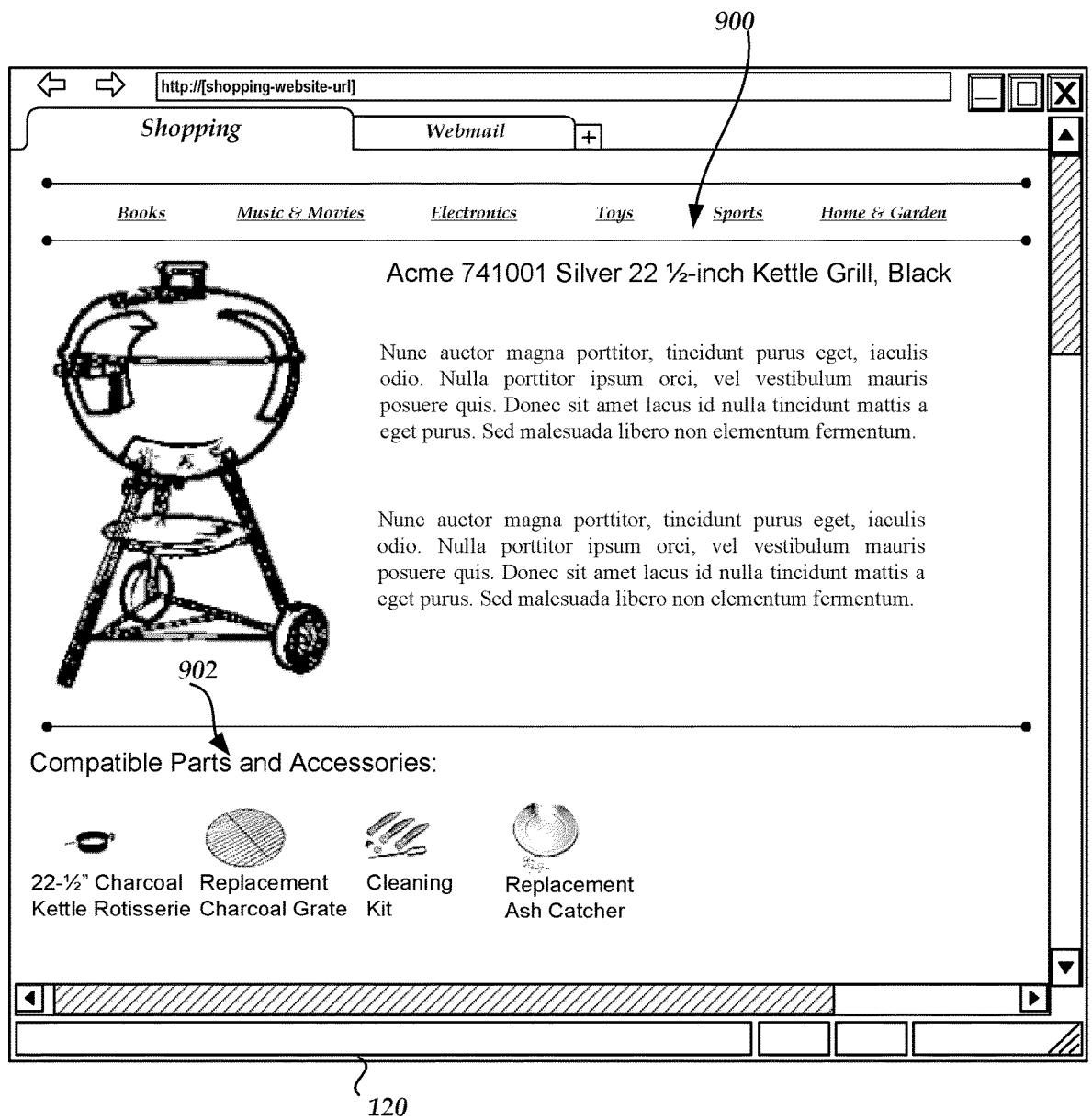
FIG. 9 illustrates a representation of an example network page displaying details about a product with a tailored listing for compatible parts and accessories.

FIG. 9 illustrates a representation of an example network page 900 displaying details about a product with listings for compatible parts and accessories 902. The network page 900 represents a detail page for a particular product. The replacement part system can determine compatible replacement parts for the particular product and a listing of some compatible replacement parts can be displayed under a heading of compatible parts and accessories 902. The replacement parts included in the compatible parts and accessories 902 portion of the network page can be sorted by any sorting criteria described herein.

Figure 10:
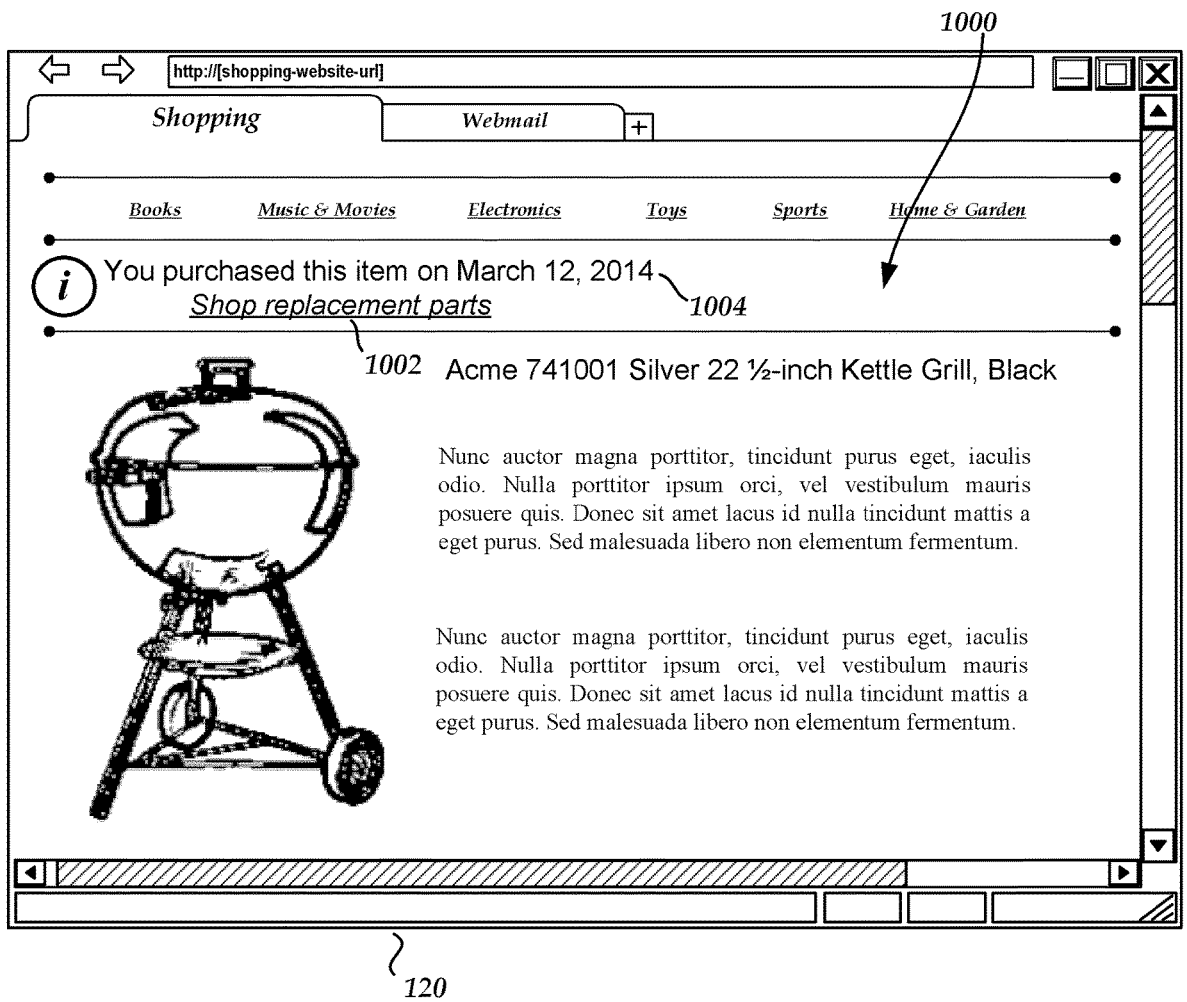
FIG. 10 illustrates a representation of an example network page providing a link to a tailored listing of compatible replacement parts.

FIG. 10 illustrates a representation of an example network page 1000 providing a link 1002 to shop for compatible replacement parts. In some embodiments, the electronic commerce system may recognize when a network page displays information about a product the user already owns. In such cases, a link 1002 can be provided that allows the user to start shopping for compatible parts for the product. The network page 1000 can include purchase information 1004 about when the particular product was purchased.

Network pages can also be configured to include elements to display replacement parts that have been sorted for display. Such elements can be positioned outside of a central location of the network page so as to provide unobtrusive information about compatible replacement parts for one or more specific models. The elements can include best-selling parts, model-specific parts based on prior interactions of other owners of a same model, model-specific parts refined by category, and/or model-specific products based on external factors (e.g., time of year, location, etc.).

Network pages can also be configured to include elements used to indicate additional items for purchase that may be of interest to a user. The additional items can be replacement parts for models, wherein the models are determined based on prior purchases by the user. This element can be presented on a network page corresponding to a replacement part store front, or launching page for exploring, searching, and/or browsing replacement parts. The element can include a list of items with the text "more items to consider for your [product model]."

Network pages that are not directly linked to the replacement part system can integrate information from the replacement part system while the user is shopping. For example, an element can be included on a network page, wherein the element is a visual representation of a user's model. The user's model can be determined based on prior purchases of the user, prior searches by the user, and/or stored information about products associated with the user (e.g., products the user has purchased). The element can be integrated on shopping pages. For example, the element can include an image of a product model accompanied by a link to a 'family page' that lists replacement parts for that model. The list of replacement parts can further be refined by product category. This element can be presented to customers throughout while browsing through the replacement part storefront, such as on category pages and/or browse node pages. This merchandising element can be configured to reinforce the personalized nature of product's model with a single click, for example.

Presentation of Items on a Network Page

Network pages can include items that are best sellers for particular product categories. For the replacement parts category, replacement parts may be displayed that are best sellers within the category but that are not compatible with a user's specified model. Accordingly, the network page can be update based on the user's specified model to include the best-selling replacement parts that are compatible with the user's specified model. To do so, the user can provide the model of the product the customer owns or is interested in. In addition, the compatible replacement parts may be sorted based on sales data, if that sales data exists for the replacement parts. This information can be presented in a dedicated element that can be included on a number of different network pages, including for example, store front pages, relevant category pages, browse node pages, and the like. In some embodiments, the element can be configured to be category-specific. For example, if a customer who has indicated which model they own visits a large appliance store front of the electronic commerce system, the widget can display the best-selling large appliance replacement parts for the user's specific product model.

Network pages can include elements that provide recommendations for related items, where the recommendations are based on a user's prior purchases. The network pages may, however, include related items that are recommended but that may not fit the customer's model. Accordingly, the replacement part system can be configured to ensure that the elements providing recommendations are based on a user-specified model as well as prior purchases of compatible replacement parts. The recommendations can then be provided by the replacement part system, where the recommendations are based on the user's model and the previously purchased replacement parts. For example, the element can be entitled "More Items To Consider For Your [product model]."

Network pages can include sorted items where the sorting is based on sales rank data. For replacement parts, the sales rank data may be based on overall sales, regardless of a specific product model of the user. For example, if 100 owners of Model A and 10 owners of Model B have all purchased Part X (which fits both models A and B), while 10 owners of Model A and 90 owners of Model B have all purchased Part Y (which fits both models A and B), Part X will have a higher sales rank than Part Y (since 110>100). As a result, Part X may be featured more prominently to owners of Model B on the network pages. This may be disadvantageous because these users may have more interest in Part Y. Accordingly, the replacement part system can be configured to provide model-specific sales rankings where ranking of replacement parts is calculated based on purchases by particular model owners. This model-specific sales ranking can then be utilized to show model owners those products that similar owners purchase most commonly. These rankings can be configured to exist at different model hierarchies. For example, one ranking of a product could exist for Whirlpool refrigerator EDSCHQXKTO3 model owners, a different ranking could exist for Whirlpool refrigerator owners overall, and a different ranking could exist for all Whirlpool owners.

Network pages can also be configured to include elements that provide model-specific product category relevance for replacement parts. This may then be used to merchandise these product categories to particular model owners. For example, purchase data may indicate that Whirlpool owners are the most frequent purchasers across all product model owners of large appliance parts. It may be advantageous, then, to automatically provide a listing of the top-selling Whirlpool-fitting off-filters to Whirlpool owners when they visit the network page. Similarly, purchase data may indicate that John Deer owners are the most frequent purchasers of mower blades. It may be advantageous, then, to automatically provide a listing of the Lawn Care product category to John Deer owners.

Network pages can be configured to incorporate the use of external factors to tailor or personalize display of replacement parts. External factors can include, for example and without limitation, location, season, or current weather conditions. For example, the replacement part system can be configured to providing listings of lawn mower blades to a customer from Minnesota in June for their Lawn Mower LP92334 Model and switch in October for parts for their Toro Snow Blower 38371 model. Machine learning can be employed to improve the efficacy of such cases by learning what weight to give external factors when deciding what items to show the user. Based off of historical data, customer A may be heavily influenced by the seasonality factor whereas customer B has a propensity to be influenced primarily by current weather conditions. By incorporating external factors such as location and season, the replacement part system can further enhance the user experience.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as physical electronic hardware, or as a combination of computer software and physical electronic hardware. To clearly illustrate this interchangeability, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device configured to perform specific executable instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of one or more computing devices configured with specific computer executable instructions,
   retrieving a set of items from an electronic catalog, the set of items corresponding to items retrieved based on a received electronic search query;
   providing the set of items to a user computing device;
   obtaining a specified model of a product;
   automatically identifying, based at least partly on the electronic search query and one or more historical queries, that the electronic search query is directed to replacing at least a portion of the product;
   automatically identifying a plurality of replacement parts from the set of items based on identifying that the electronic search query is directed to replacing at least a portion of the product;
   selecting a sorting criteria for sorting the identified plurality of replacement parts, the sorting criteria including a popularity of a replacement part;
   generating a sorted set of replacement parts, wherein each of the plurality of replacement parts is ranked based at least partly on the popularity of the replacement part; and
   causing a user interface to display the sorted set of replacement parts and the specified model of the product in separate, non-overlapping portions of the user interface.

2. The computer-implemented method of claim 1, wherein the specified model of the product is obtained from a data store configured to store one or more specified models of products associated with the user device.

3. The computer-implemented method of claim 1, wherein the popularity of the replacement part corresponds to a number of sales of the replacement part.

4. The computer-implemented method of claim 1, wherein the popularity of the replacement part corresponds to a ranking of the replacement part among users that own the specified model of the product.

5. The computer-implemented method of claim 1, wherein the sorted set of replacement parts includes replacement parts manufactured by an original equipment manufacturer and generic replacement parts.

6. The computer-implemented method of claim 5, wherein the sorted set of replacement parts, when viewed on the user computing device, are arranged so that replacement parts manufactured by the original equipment manufacturer appear adjacent to at least one generic replacement part.

7. The computer-implemented method of claim 1, wherein the plurality of replacement parts are stored in a replacement part data store, the replacement part data store configured to provide relationships between replacement parts and models of products.

8. The computer-implemented method of claim 1, wherein the specified model of the product is obtained from the user computing device.

9. The computer-implemented method of claim 1, further comprising receiving a request to remove items from the set of items that are not replacement parts for the specified model of the product.

10. A system comprising:
    a data store configured to store computer executable instructions; and
    a computing device in communication with the data store, the computing device, when executing the computer executable instructions, configured to at least:
    retrieve a set of items from an electronic catalog, the set of items corresponding to items retrieved based on a received electronic search query;
    obtain a specified model of a product;
    automatically identify, based at least partly on the electronic search query and one or more historical queries, that the electronic search query is directed to replacing at least a portion of the product;
    automatically identify a plurality of replacement parts from the set of items based on identifying that the electronic search query is directed to replacing at least a portion of the product;
    select a sorting criteria for sorting the identified plurality of replacement parts, the sorting criteria including a popularity of a replacement part;
    generate a sorted set of replacement parts, wherein each of the plurality of replacement parts is ranked based at least partly on the popularity of the replacement part; and
    cause a user interface to display the sorted set of replacement parts and the specified model of the product in separate, non-overlapping portions of the user interface.

11. The system of claim 10, wherein the popularity of the replacement part corresponds to one of a number of sales of the replacement part or a ranking of the replacement part among users that own the specified model of the product.

12. The system of claim 10, wherein the sorted set of replacement parts includes replacement parts manufactured by an original equipment manufacturer and generic replacement parts.

13. The system of claim 12, wherein the sorted set of replacement parts, when viewed on the user computing device, are arranged so that replacement parts manufactured by the original equipment manufacturer appear adjacent to at least one generic replacement part.

14. The system of claim 10, wherein the plurality of replacement parts are stored in a replacement part data store, the replacement part data store configured to provide relationships between replacement parts and models of products.

15. The system of claim 10, wherein the computer-executable instructions further comprise instructions to receive a request to remove items from the set of items that are not replacement parts for the specified model of the product.

16. A non-transitory computer-readable medium storing computer-executable instructions that, upon execution by one or more computer systems, cause the one or more computer systems to:
retrieve a set of items from an electronic catalog in response to reception of a search query;
obtain a specified model of a product;
automatically identify, based at least partly on the search query and one or more historical queries, that the electronic search query is directed to replacing at least a portion of the product;
automatically identify a plurality of replacement parts from the set of items based on identifying that the electronic search query is directed to replacing at least a portion of the product;
select a criteria for sorting the identified plurality of replacement parts;
generate a sorted set of replacement parts, wherein each of the plurality of replacement parts is ranked based at least partly on a the popularity of the replacement part; and
cause a user computing device to display the sorted set of replacement parts and the specified model of the product in separate, non-overlapping portions of a user interface.

17. The non-transitory computer-readable medium of claim 16, wherein the sorted set of replacement parts includes replacement parts manufactured by an original equipment manufacturer and generic replacement parts, and wherein the sorted set of replacement parts, when viewed on the user computing device, are arranged so that replacement parts manufactured by the original equipment manufacturer appear adjacent to at least one generic replacement part.

* * * * *

UNITED STATES PATENT AND TRADEMARK OFFICE
CERTIFICATE OF CORRECTION

| | |
|---|---|
| PATENT NO. | : 11,727,459 B2 |
| APPLICATION NO. | : 16/932551 |
| DATED | : August 15, 2023 |
| INVENTOR(S) | : Meghan Lagoni et al. |

It is certified that error appears in the above-identified patent and that said Letters Patent is hereby corrected as shown below:

In the Specification

Column 20, Line 50, delete "EDSCHQXKTO3" and insert -- EDSCHQXKT03 --.

In the Claims

Column 26, Line 13, Claim 16, delete "a the" and insert -- the --.

Signed and Sealed this
Nineteenth Day of December, 2023

Katherine Kelly Vidal
*Director of the United States Patent and Trademark Office*